US011780413B1

(12) United States Patent
Nack

(10) Patent No.: US 11,780,413 B1
(45) Date of Patent: Oct. 10, 2023

(54) EMERGENCY BRAKE ASSISTANCE SYSTEM FOR BICYCLES

(71) Applicant: Vincent Emilian Nack, Munich (DE)

(72) Inventor: Vincent Emilian Nack, Munich (DE)

( * ) Notice: Subject to any disclaimer, the term of this patent is extended or adjusted under 35 U.S.C. 154(b) by 0 days.

(21) Appl. No.: 18/089,403

(22) Filed: Dec. 27, 2022

(51) Int. Cl.
| | | |
|---|---|---|
| *B60T 7/22* | (2006.01) | |
| *B62J 45/412* | (2020.01) | |
| *B62J 45/414* | (2020.01) | |
| *B62J 45/415* | (2020.01) | |
| *B60T 8/17* | (2006.01) | |
| *B62L 3/02* | (2006.01) | |
| *B60T 8/171* | (2006.01) | |

(52) U.S. Cl.
CPC .............. *B60T 7/22* (2013.01); *B60T 8/171* (2013.01); *B60T 8/1706* (2013.01); *B62J 45/412* (2020.02); *B62J 45/414* (2020.02); *B62J 45/4151* (2020.02); *B62L 3/023* (2013.01); *B60T 2210/32* (2013.01); *B60T 2230/02* (2013.01); *B60T 2250/04* (2013.01)

(58) Field of Classification Search
CPC .......... B60T 7/22; B60T 8/1706; B60T 8/171; B60T 2210/32; B60T 2230/02; B60T 2250/04; B62J 45/412; B62J 45/414; B62J 45/4151; B62L 3/023
See application file for complete search history.

(56) References Cited

U.S. PATENT DOCUMENTS

2017/0021827 A1* 1/2017 Seagraves .............. B62J 45/414

OTHER PUBLICATIONS

BMDV, "More road safety through better emergency brake assistants for trucks and buses". https://www.bmvi.de/SharedDocs/DE/Artikel/StV/Strassenverkehr/notbremsassistent.html. 4 pages as printed, bearing date of Mar. 25, 2022, accessed Sep. 9, 2022.
BMDV, "Safety4Bikes". https://www.interaktive-technologien.de/projekte/safety4bikes. 3 pages as printed, accessed Sep. 9, 2022.
APTIV, "Radar Enables Advanced Safety for Bicyclists". https://www.aptiv.com/en/insights/article/radar-enables-advanced-safety-for-bicyclists,zuletzt. 3 pages as printed, bearing date of Jun. 18, 2020, accessed Sep. 9, 2022.

(Continued)

*Primary Examiner* — Faris S Almatrahi
*Assistant Examiner* — Andrew J Cromer
(74) *Attorney, Agent, or Firm* — Banner & Witcoff, Ltd.

(57) ABSTRACT

According some aspects, an automated bicycle emergency braking system may be retrofitted to a commercial pedestrian bicycle to provide emergency braking functionality. Aspects described therein detail a light-weight and consumer affordable automated bicycle emergency braking system for improving pedestrian bicycle safety. Aspects described therein relate to sensing of a bicycle's surroundings for potentially hazardous objects, identifying a potentially hazardous road condition, determining whether to engage a bicycle's mechanical braking system, determining how long to engage a bicycle's mechanical braking system, and disengaging a bicycle's mechanical braking system until determining confirmation of resolution of the pedestrian bicyclist's safety regarding the identified potentially hazardous road condition.

20 Claims, 8 Drawing Sheets

(56) References Cited

OTHER PUBLICATIONS

Arduino Project Hub, "How to use the L298N Motor Driver". https://create.arduino.cc/projecthub/ryanchan/how-to-use-the-l298n-motor-driver-b124c5. 32 pages as printed, bearing date of Jul. 17, 2020, accessed Sep. 9, 2022.

Bayerischer Rundfunk, "Mehr Sicherheit für Radfahrer," video report dated Jun. 11, 2022. Available at https://www.ardmediathek.de/video/br24/mehr-sicherheit-fuer-radfahrer/br-fernsehen/Y3JpZD ovL2JyLmRIL3ZpZGVvL2ZjMGRmYzJmLTkyYzYlNGYwYi1iY TNkLWM2N2YzMWM0ZmUxMA. Please see Concise Statement of Relevance submitted herewith.

* cited by examiner

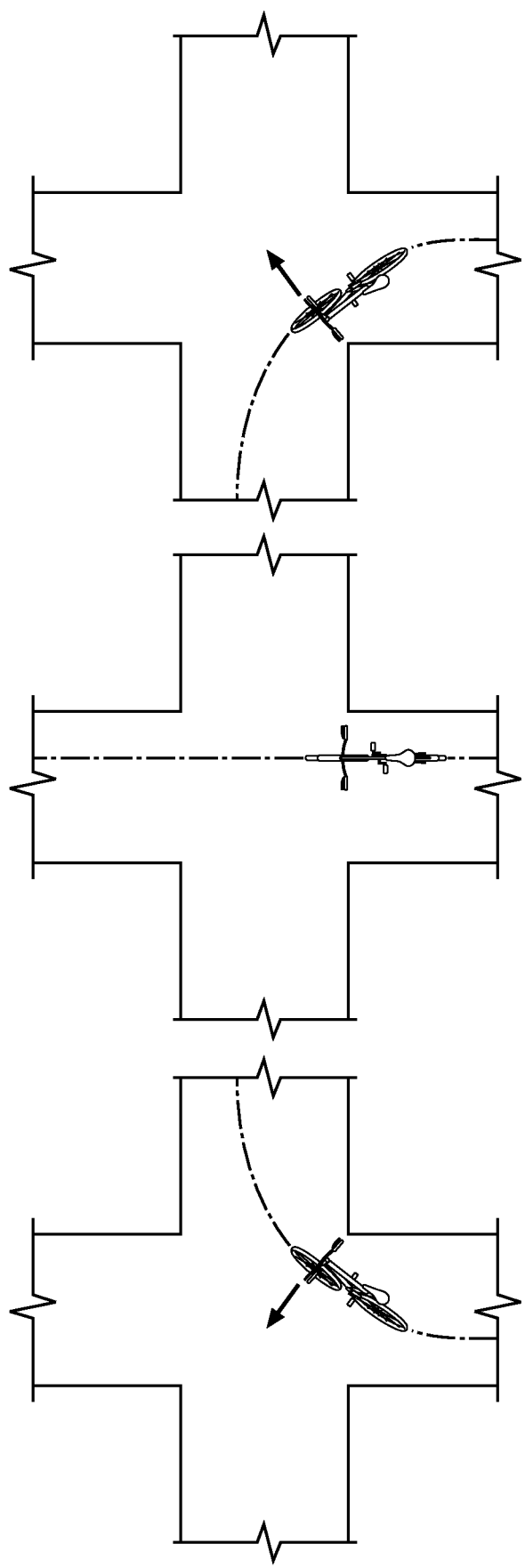

EMERGENCY BRAKE ASSISTANCE SYSTEM FOR BICYCLES

FIELD OF USE

Aspects of the disclosure relate generally to an automated emergency braking system for a pedestrian pedal bicycle. More specifically, aspects of the disclosure provide techniques and systems for sensing environmental objects, determining potentially dangerous scenarios, and emergency engagement of a bicycle's braking system without injuring the rider.

BACKGROUND

Cycling is a popular and environmentally friendly means of transport and leisure activity, but it is also associated with an increased risk of road accidents, particularly when sharing the roadway with automobiles and other motorized vehicles. Cycling has seen an increase in recent years as a means of transport and for general commuting. In contrast to the progress made in the automotive industry, which has increasingly established safety systems for cars, trucks, and motorcycles in recent years, assistance systems or automatic emergency braking system for daily bicycle use in road traffic are as of yet unknown.

The automotive industry utilizes autonomous braking systems incorporating cameras, radar, and LiDAR to detect the presence of potential hazards ahead of the vehicle and apply the brakes to either avoid a collision or reduce severity of an accident. Most systems also combine autonomous braking with an audible and/or visual warning to the driver of an impending collision. If the driver fails to act in time, the autonomous braking system intervenes and initiates emergency braking on behalf of the driver.

In contrast to the automotive industry, the cycling community does not have a proven emergency braking assistance system that can be easily retrofitted onto commercially available pedestrian-pedal powered bicycles. Several issues and problems make implementing an emergency braking assistance system for a bicycle very different from an autonomous braking system designed for an automotive vehicle. The locomotion on a bicycle differs in many important ways. For example, in contrast to a car, bicycles are not required to drive in fixed lanes, bicyclists engage in rapid steering movements and frequent lane changes, and the spatial proximity to pedestrians and/or other collision hazards (including other means of transport such as cars and buses) is significantly higher. Further, bicyclists lean the bicycle from side to side to make turns and otherwise adjust the direction of the bicycle. The complex risk assessments in automotive assistance systems would therefore lead to a high number of false braking events in the case of bicycles and are not practicable for retrofitting a bicycle. Another consideration is the lower general cost of bicycles and bicycle transportation, as well as the limited space and weight that can be added to a pedestrian bicycle.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may relate to an automated emergency braking system for a pedestrian pedal bicycle. For example, aspects described herein may provide a system for emergency braking assistance that may be retrofitted on a commercially available bicycle. The emergency braking assistance system may be made at a manageable cost relative to pedestrian bicycles by using ultrasonic sensors, a gyroscope, an accelerometer, and a microprocessor. The emergency braking assistance system can autonomously detect dangerous situations (e.g., a possible collision with a car, etc.), warn the rider, and initiate a controlled and automatic emergency braking of the bicycle. Dangerous situations detected by the emergency braking assistance system could include imminent frontal collisions and broadside collisions while turning.

The control system for the automated emergency braking system, according to some aspects described herein, may take into account various aspects of bicycle motion in applying a controlled and automatic braking of the bicycle via an existing brake system of the bicycle. For example, according to some aspects, the automated emergency braking system may determine a strength of braking force to be applied based on a speed of the bicycle and/or a distance to an object. The automated emergency braking system may determine a duration to apply the braking force in an attempt to avoid a collision. The strength and/or braking force may be determined based on both safely braking to avoid a collision with an object, but also based on provided a controlled and manageable braking force suitable for the bicyclist.

The automated emergency braking system, according to some aspects described herein, may operate to detect both frontal collisions as well as side collisions. Detecting side collisions, however, may involve collecting sensor data prone to false positives as the rider is simply driving past an object. When riding a bicycle, the bicyclist will frequently lean the bicycle in one direction or the other to effect a turn and/or otherwise adjust a direction of the bicycle's travel. Angling the bicycle to one side may cause a sensor configured to detect a distance to objects on that side to identify the ground as a nearby object and presenting a risk of collision. According to some aspects described herein, the automated emergency braking system may consider the bank angle and/or angle of incident for the bicycle in determining whether to assess distance data from side sensors. The bank angle may be used to determine whether the user is engaged in a turn. Distance data from the side sensors may be disregarded, or the sensors may be disabled, when the user is not turning to avoid false indications of a potential side collision when the user is simply riding past an object. And a direction of the bank angle may determine which side sensor the control logic should assess for potential collisions.

Aspects described herein may therefore provide an automated braking system configured to attach to a bicycle and engage a braking system of the bicycle. The automated braking system may comprise an accelerometer and/or speedometer for use in determining a velocity of the bicycle. The automated braking system may also include a gyroscope for use in determining a bank angle of the bicycle. The automated braking system may include one or more distance sensors. The distance sensors may include a front distance sensor, mounted to a front of the bicycle; at least one right side distance sensor, oriented to measure a distance to objects on a right side of the bicycle relative to the front distance sensor; and at least one left side distance sensor, oriented to measure a distance to objects on a left side of the bicycle relative to the front distance sensor. In some implementations, the distance sensors may comprise ultrasonic sensors. In other implementations, the distance sensors may comprise a LIDAR array configured to detect distances in each direction. The automated braking system may include a braking interface device configured to engage the braking system of the bicycle to apply braking pressure to a wheel of the bicycle. And the automated braking system may include a control device configured to control the braking interface device to apply braking pressure to the wheel of the bicycle based on distance data from the one or more distance sensors.

The control device may be configured to control the braking interface device to apply braking pressure to the wheel of the bicycle based on a front distance sensor to avoid frontal collisions. The control device may control the braking interface device to apply braking pressure based on a determination that the front distance sensor senses a first front distance measurement that is below a first threshold distance and a velocity of the bicycle as determined from the accelerometer or speedometer is greater than a first threshold velocity.

The control device may be configured to control the braking interface device to apply braking pressure to the wheel of the bicycle based on a side distance sensor, configured to measure a distance to objects on a left and/or right side of the bicycle to avoid side/broadside collisions. The control device may control the braking interface device to apply braking pressure based on a determination that the left/right side distance sensor senses a left/right side distance measurement less than a second threshold distance and the velocity of the bicycle as determined from the accelerometer or speedometer is greater than a second threshold velocity. According to some aspects, the control device may first determine whether the gyroscope senses a bank angle greater than a threshold bank angle with an inclination to the left/right before determining whether the left/right distance sensors detect a distance measurement within the threshold distance. This may avoid incorrectly detecting a possible collision when the bicycle is leaned at an angle such that the side distance sensor is pointed at the ground.

In some implementations, the first threshold distance used for frontal distances and the second threshold distance used for side distances may be the same. In other implementations, different threshold distances may be used for detecting potential frontal collisions and left/right side collisions. Similarly, the first threshold velocity used for frontal distances and the second threshold used for side distances velocity may be the same threshold or different thresholds. These thresholds may be adapted to the different nature and likelihoods involved with frontal collisions and side collisions.

In some implementations, the braking interface device of the automated braking system may engage a braking system of the bicycle by asserting a force on a handlebar brake lever to apply braking pressure to the wheel of the bicycle. In other implementations, the braking interface device may engage the braking system of the bicycle by applying pressure in a hydraulic line of the braking system of the bicycle. Applying pressure in a hydraulic line of the braking system of the bicycle may comprise increasing pressure in the hydraulic line over a period of time to affect a safe and controlled braking of the bicycle.

The control device of the automated braking system, according to some aspects, may control the braking interface device to apply braking pressure to the wheel of the bicycle over a duration of a first braking period in response to detecting a potential front and/or side collision. The braking period may be determined based on distance information from the front and/or left/ride side distance sensors. Different braking periods may apply in the event that front or left/right side collisions are detected. The braking interface device may apply increasing braking pressure over the first braking period, whether for the front distance sensor or the left/right side distance sensor. The control device may be configured to control the braking interface device to apply braking pressure to the wheel of the bicycle for an additional braking period when the front and/or left/right side distance sensors sense a second distance measurement after the first braking period and when a difference between the first distance measurement and the second distance measurement is greater than a threshold distance difference. Different threshold distance differences may be used in the event that front or left/right side collisions are detected.

The braking pressure applied by the braking interface device may be scaled by the control device using a kinetic scaling value determined based on a kinetic energy of the bicycle. The first front distance braking period, first side distance braking period, and/or additional braking period may be subject to scaling. The kinetic scaling value may be determined based on a user configurable parameter. In some embodiments, the user configurable parameter may correspond to a mass of the bicycle and/or a mass of a rider of the bicycle. The user configurable parameter may correspond to a maximum safe braking pressure, and the kinetic scaling value may be determined based on a maximum safe braking speed.

Other aspects described herein may provide an automated braking system configured to attach to a bicycle and engage a braking system of the bicycle. The automated braking system may comprise an accelerometer and/or speedometer for use in determining a velocity of the bicycle. The automated braking system may also include a gyroscope for use in determining a bank angle of the bicycle. The automated braking system may include a sensor array comprising one or more sensors and configured to measure: a front distance to objects in front of the bicycle; a right side distance to objects on a right side of the bicycle, relative to the front of the bicycle; and a left side distance to objects on a left side of the bicycle, relative to the front of the bicycle. In some implementations, the sensor array may comprise a LIDAR array configured to detect distances in each direction. distance sensors. In other implementations, the sensor array may comprise ultrasonic sensors. The automated braking system may include a braking interface device configured to engage the braking system of the bicycle to apply braking pressure to a wheel of the bicycle. And the automated braking system may include a control device configured to control the braking interface device to apply braking pressure to the wheel of the bicycle based on distance data from the sensor array.

The control device may be configured to control the braking interface device to apply braking pressure to the wheel of the bicycle based on a front distance sensed by the sensor array to avoid frontal collisions. The control device may control the braking interface device to apply braking pressure based on a determination that the sensor array senses a first front distance measurement that is below a first threshold distance and a velocity of the bicycle as determined from the accelerometer or speedometer is greater than a first threshold velocity.

The control device may be configured to control the braking interface device to apply braking pressure to the wheel of the bicycle based on a side distance sensed by the sensor array, configured to measure a distance to objects on a left and/or right side of the bicycle to avoid side/broadside collisions. The control device may control the braking interface device to apply braking pressure based on a determination that the sensor array senses a left/right side distance measurement less than a second threshold distance and the velocity of the bicycle as determined from the accelerometer or speedometer is greater than a second threshold velocity. According to some aspects, the control device may first determine whether the gyroscope senses a bank angle greater than a threshold bank angle with an inclination to the left/right before determining whether the sensor array detects a side distance measurement within the threshold distance. This may avoid incorrectly detecting a possible collision when the bicycle is leaned at an angle such that the sensor array is pointed at the ground in the direction the bicycle is leaning.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 7A, 7B, and 7C depict an illustrative sequence of frames in an aerial view of the bicycle riding scenarios depicted in FIGS. 6A, 6B, and 6C.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Additionally, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, and techniques for automated emergency braking of a pedal-powered bicycle. For example, aspects described herein may provide a system for automatically braking or decelerating a bicycle in a hazardous road environment or condition. Potentially hazardous road conditions include stopped or parked vehicles in the road way, unexpected automotive door opening in the bicycle's path, objects falling into the bicycle's path, or T-bone situations where an automotive vehicle turns into the bicycle rider's side.

Figure 1:
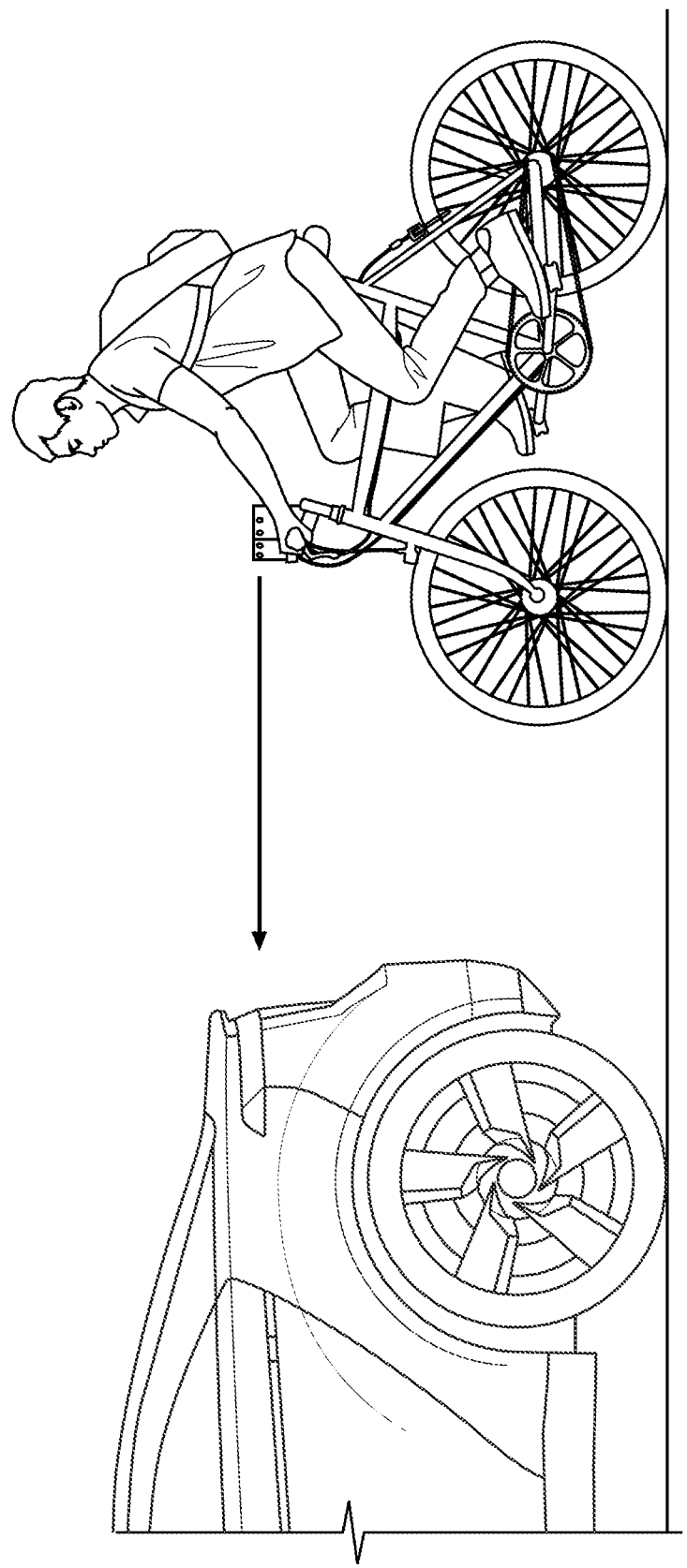
FIG. 1 depicts an illustrative scenario of an emergency braking system for a bicycle sensing a potentially hazardous object to the bicycle rider and implementing one or more aspects of the disclosure in accordance with one or more illustrative aspects discussed herein to improve the safety of the bicycle rider.

FIG. 1 illustrates an exemplary scenario of an automated bicycle emergency braking system attached to a rider's bicycle sensing a potentially hazardous obstacle in the rider's path such as another road vehicle. A bicycle emergency braking system, such as one illustrated in FIG. 1, is capable of either stopping or slowing the bicycle without input by or the attention of the rider. The automated bicycle emergency braking system senses the bicycle's surroundings and metrics of the bicycle such as the bicycle's speed or velocity and angle of incident to determine whether to slow and/or stop the bicycle.

Figure 2:
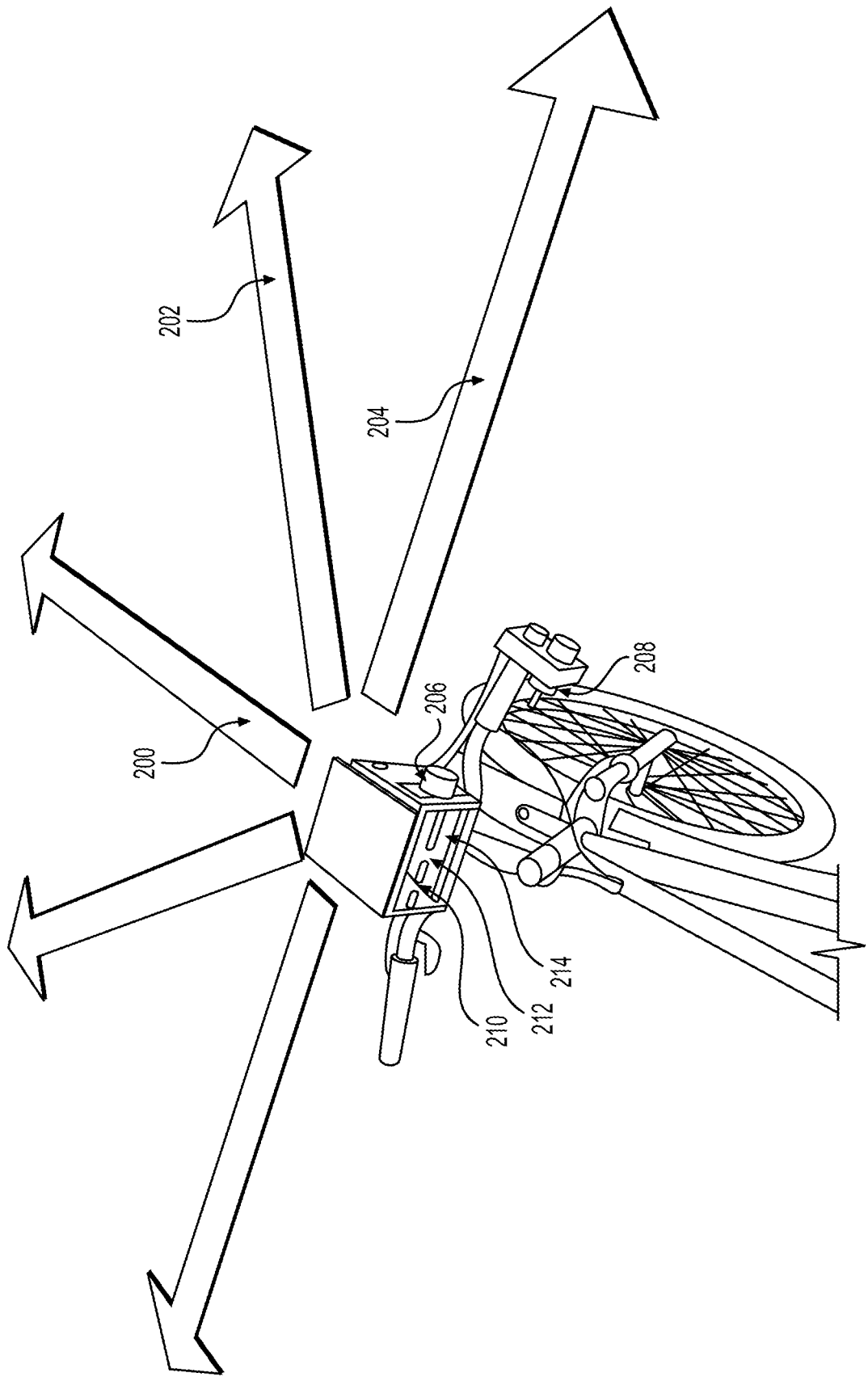
FIG. 2 depicts an illustration of an automated bicycle emergency braking system and its associated environmental sensing applications.

FIG. 2 illustrates an embodiment of an automated bicycle emergency braking system comprising a sensor array, gyroscope 210, internal computing device 212, and motor driver 214 which controls the electric motor 208. The sensor array may be comprised of any type of distance measuring sensor such as an ultrasonic sensor, RADAR, or LiDAR. In some embodiments where the sensor array is comprised of one or more ultrasonic sensors, there is at least one ultrasonic sensor active and sensing for obstructions in front direction 200. Additionally, the sensor array can also comprise one or more ultrasonic sensors that are active and sensing for obstructions in lateral directions 204 or diagonal directions 202. Alternatively, the sensor array could be a LiDAR sensor that continuously senses for obstructions in front direction 200, lateral directions 204, and diagonal directions 202. Additionally, the LiDAR sensor may be placed upon a motorized gimbal or other stabilization rig to be kept horizontal when the bicycle inclines during turns in order to maintain a more functional field of view for the LiDAR sensor. Gyroscope 210 of the automated emergency braking system measures the angle of inclination of the bicycle.

To provide a system that is simple enough so that it can be used universally in all lighting conditions on a commercially available bicycle at a manageable cost, the automated bicycle emergency braking system may comprise commercially available ultrasonic sensors to implement the sensor array. Through the use of ultrasonic sensors (and/or other types of sensors as described herein), distances to potential obstacles in front of the bicycle may be determined. These distance measurements may form the basis for the programming decision as to whether or not emergency braking should be triggered.

But in the case of obstacle detection using ultrasonic sensors beyond standard straight-ahead scenarios, several complications arise. For turning maneuvers, ultrasonic sensors may be mounted laterally to sense the sides of the bicycle as well. However, due to the close proximity to parked cars or other objects, this may lead to an increased risk of false emergency braking, since the system may recognize these actually harmless objects as obstacles. This problem may be prevented by the installation of a gyroscope 210, according to aspects described further herein. The gyroscope can measure the inclination of the bicycle, which may be used to determine whether the cyclist is either turning left or right; or still cycling straight ahead. Gyroscope data may therefore be used in the programming of the automated bicycle emergency braking system, where the system may be programmed to consider the signals of lateral ultrasonic sensors only in a curve situation and thus prevent false braking when riding straight ahead but also near objects such as walls, parked vehicles, etc.

Data measurements from the sensor array and the gyroscope 210, among other sensors, are input to the internal computing device 212 which uses said data measurements to determine whether the braking system of the bicycle needs to be activated for an emergency. In one embodiment, if the internal computing device 212 determines that emergency braking is needed, it directs via motor driver 214 the electric motor 208 to engage the hand lever brake of the bicycle and thus engage braking. Some implementations may provide emergency braking by applying physical pressure via an electric motor and/or actuator to the hand lever providing rear brake control for the rear wheel of the bicycle. Other implementations may provide emergency braking by injecting hydraulic pressure into a hydraulic line controlling the brakes of the bicycle. Similarly, it may be preferable to conduct emergency braking by applying hydraulic pressure to the rear brakes. Emergency braking by applying pressure to the front brake may require a high braking force and may present higher safety risks to the rider due to the risk of flipping the bicycle and rider over the front wheel.

The internal computing device 212 may be a device such as a Raspberry Pi. Additionally, some embodiments of the automated bicycle emergency braking system may also include a loudspeaker 206 that plays a chime, beep, or other sound when the automated emergency braking system engaging the braking system of the bicycle to alert the rider of the bicycle's deacceleration.

Figure 3B:
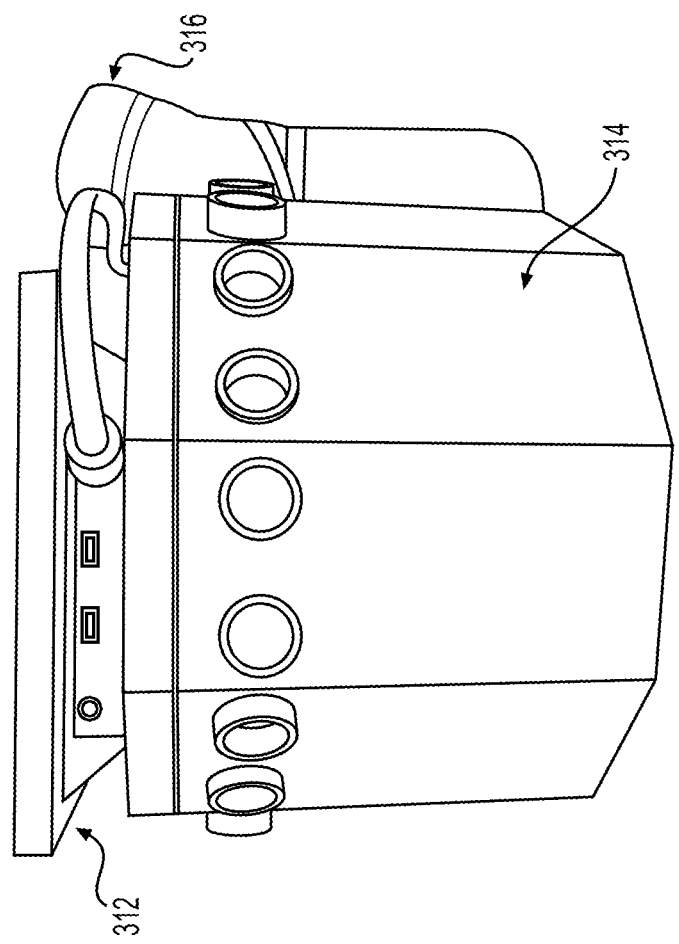
FIGS. 3A-3C depict an embodiment of an automated bicycle emergency braking system.
Figure 3A:
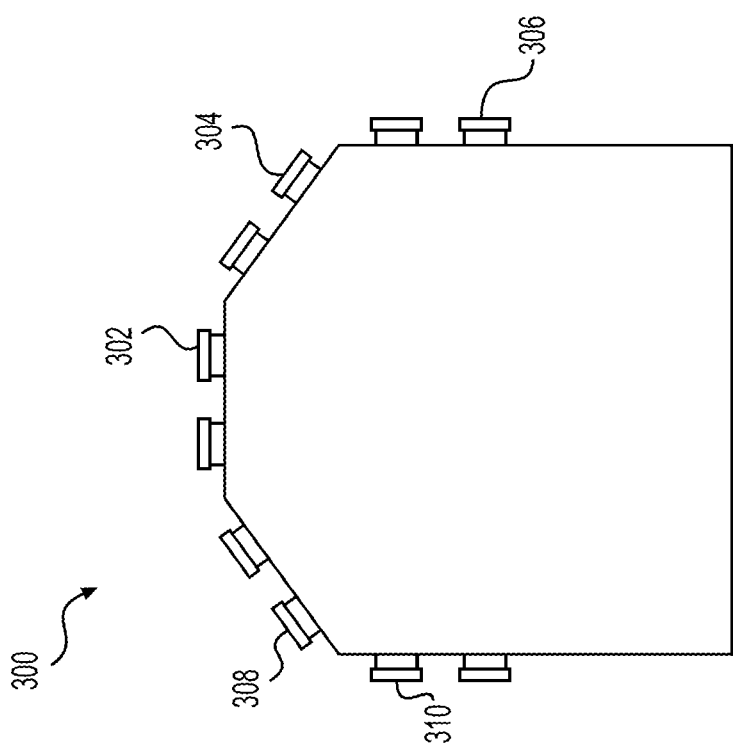

FIG. 3A illustrates a top view of an exemplary automated bicycle emergency braking system 300 comprising ultrasonic sensors for distance measurements. In one embodiment, forward facing ultrasonic sensor 302 senses for obstructions in a front direction. Lateral ultrasonic sensors 306 and 310 sense for obstructions in a lateral direction and diagonal ultrasonic sensors 304 and 308 sense for obstructions in a diagonal direction. As can be seen in FIG. 3B, a housing unit 314 may hold the ultrasonic sensors 302, 304, 306, 308, and 310. Support lid 312 covers and provides protection to the internal devices and in other embodiments may support a computer screen or other monitor that visually displays messages from the automated bicycle emergency braking system to the rider in human readable format. Battery pack 316 powers the automated bicycle emergency braking systems and in the depicted embodiment of FIG. 3B resides outside the housing unit 314.

Figure 3C:
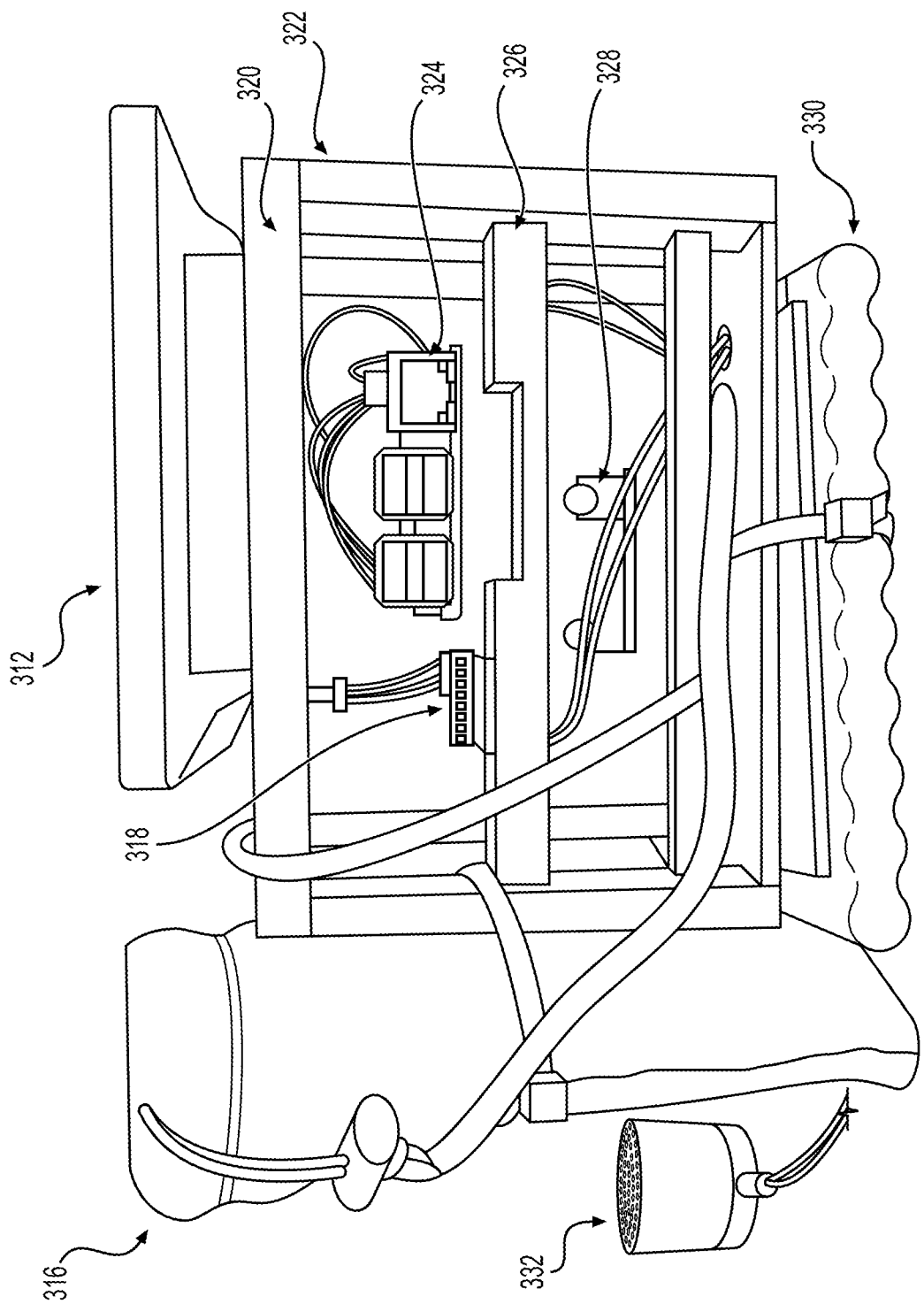

As can be seen in FIG. 3C, the housing unit 314 in certain embodiments provides protection to internal devices of the automated bicycle emergency braking system. In one embodiment, the internal cavity of the housing unit 314 is partitioned by a divider 326 with a slot securing the internal computing device 324 and also housing the gyroscope 318. Additionally, the motor driver 328 may also be located underneath the divider 326. These internal components of the automated bicycle emergency braking system (gyroscope 318, internal computing device 324, and/or motor driver 328) are protected by a lid 320. In some embodiments, attached to the lid 320 is a screen 312 that is capable of visually displaying messages or alerts from the automated bicycle emergency braking system.

In one embodiment, the battery pack can comprise two individual batteries for powering different components of the automated bicycle emergency braking system such as auxiliary battery pack 316 and principal battery pack 330. In some embodiments, auxiliary battery pack 316 powers the internal computing device 324 and the principal batter pack powers the motor driver 328 for engaging the braking system of the bicycle. The automated bicycle emergency braking system may also have a sound speaker 332 that can play an audio alert such as a beep, chime, musical intonation sequence, or other sound when the automated emergency braking system engages the braking system of the bicycle to alert the rider of the bicycle's deacceleration.

Figure 4:
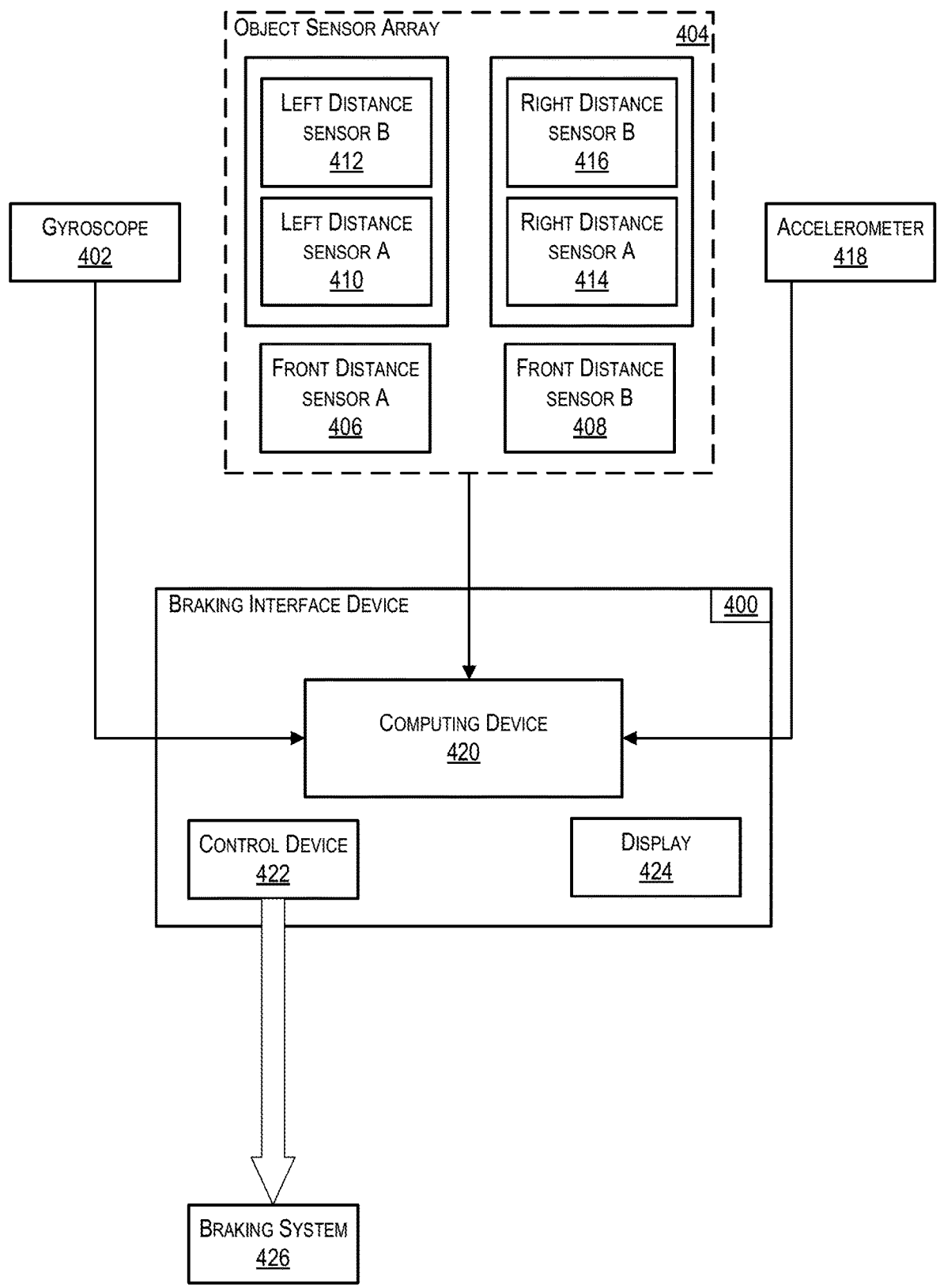
FIG. 4 depicts an illustrative block diagram of an automated bicycle emergency braking system, in accordance with one or more illustrative aspects discussed herein.

FIG. 4 is an exemplary automated bicycle emergency braking system comprising a braking interface device 400; several sensors including a gyroscope 402, an object sensor array 404, and accelerometer 418; and interfacing with the braking system 426 of the bicycle. The gyroscope 402 senses the inclination of the bicycle and sends the bicycle inclination data to the computing device 420 within the braking interface device 400. The computing device 420 can be a RASPBERRY PI or any other collection of programmable microprocessors.

The object sensor array 404 comprises the sensor(s) the detect the environment surrounding the bicycle of the automated bicycle emergency braking system. The object sensor array 404 sends information regarding the environment and potential obstacles or hazardous objects to the computing device 420 of the braking interface device. In the embodiment illustrated in FIG. 4, the object sensor array 404 comprises a series of monodirectional distance sensors that are arranged to sense the front of the bicycle and right and left sides of the bicycle. As depicted in FIG. 4, the object sensor array 404 may introduce redundancy for sensing each direction for safety—i.e., front distance sensor 406 and 408 are both oriented to sense the surroundings in front of the bicycle. In one embodiment, front distance sensors 406 and 408 are continuously sensing in the forward direction of the bicycle. Left distance sensor 410 and 412 are both oriented to sense the surroundings to the left of the bicycle while right distance sensor 414 and 416 are both oriented to sense the surroundings to the right of the bicycle. In some embodiments, the left and right distance sensors may continuously sense in their respective directions and send their respective data to the computing device 420. In other embodiments, the computing device may selectively power on or off the left or right distance sensors based on data from the gyroscope 402.

The distance sensors 406, 408, 410, 412, 414, and 416 may be ultrasonic sensors and they send distance data to the computing device 420. In an alternative embodiment, the object sensor array may comprise LiDAR or RADAR sensors that are multi-directional instead of the multiple monodirectional sensor layout as illustrated for object sensor array 404 in FIG. 4. In such an embodiment, the object sensor array still sends distance data to the computing device 420 for potentially hazardous objects to the bicycle rider.

The automated bicycle emerging braking system as depicted in FIG. 4 also comprises an accelerometer 418. The accelerometer 418 sends its measurements to the computing device 420 for speed or velocity of the bicycle to be calculated. In alternative embodiments, the accelerometer 418 could be a speedometer or any other sensor used for determining speed or velocity and whose data can be sent to the computing device 420 of the braking interface device 400 to ultimately determine the speed or velocity of the bicycle.

Figure 5:
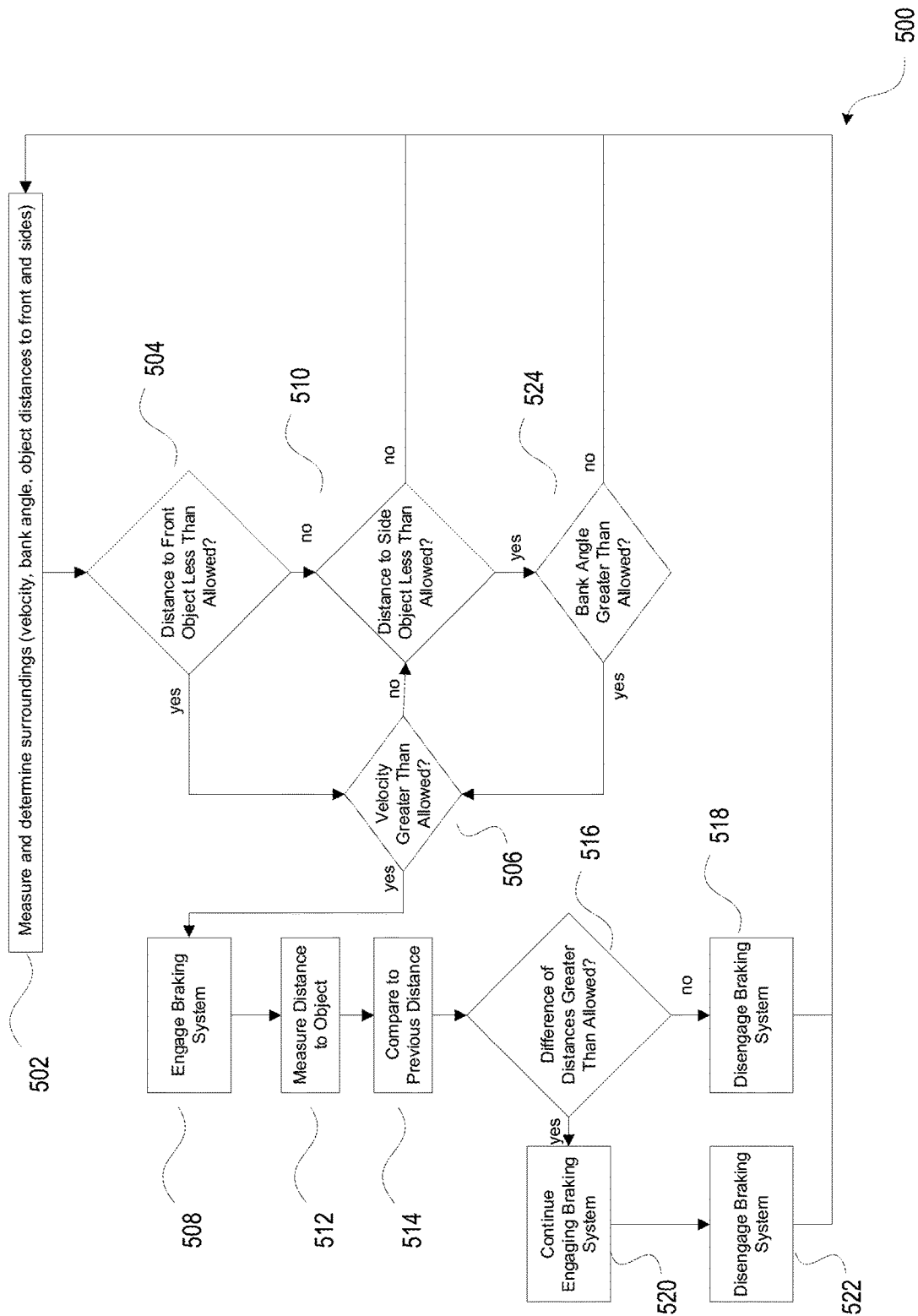
FIG. 5 depicts a flowchart illustrating a method of determining when and for long the automated bicycle emergency braking system, in accordance with one or more illustrative aspects discussed herein, should engage the braking system of a bicycle.

The computing device 420 of the braking interface device 400, using the data from the gyroscope 402, the object sensor array 404 and the accelerometer 418, determines whether to engage or disengage the braking system 426 of the bicycle. One embodiment of such a determination by the computing device 420 is illustrated in FIG. 5. If the computing device 420 determines that the braking system 426 should be engaged, the control device 422 of the braking interface device 400 actuates a force upon the braking system 426 of the bicycle to engage the braking system. Control device 422 in certain embodiments may be an electric motor that actuates upon a hand brake lever of the bicycle. In alternative embodiments, control device 422 could hydraulically act upon either or both of the brake lines to the front and rear tires of the bicycle.

Additionally, computing device 420 may provide updates to the bicycle user by presenting upon display 424 an alert when the braking interface device 400 engages the bicycle's brakes and when it disengages the bicycle's brakes. The automatic braking system may include alternative and/or additional components for alerting the user. For example, braking interface device 400 may comprise a speaker or other component to generate an audio alert, such as a loud beep. As another example, braking interface device 400 may comprise a LED or other visual indication to output a visual alert to the user.

FIG. 5 illustrates an exemplary algorithm 500 for how the computing device 420 determines whether the braking system of the bicycle needs to be engaged and if engaged, when the emergency braking should be disengaged. In step 502 the automated bicycle braking system may measure and determine the environmental surroundings including at least the velocity or speed of the bicycle, the inclination or bank angle of the bicycle, and distances between road way objects and the bicycle's front, left, and right sides. In step 504, the system may compare the distance between the bicycle and a front object to a minimum allowed front distance threshold. As one example, in some implementations a front distance threshold of 4 meters may be used. In implementations with sensors with greater ranges, such as LiDAR sensing systems, the front distance threshold can be set at further distance such as 6 meters for one example. This minimum allowed front distance threshold, in some embodiments, may be set by the user.

In certain embodiments, the program run by the automated bicycle emergency braking system to determine whether emergency braking is needed has a set time period to complete a full measuring cycle. For example, the ultrasonic and gyroscope sensor arrangement described above may need about 0.1 seconds for a complete measuring cycle. Further the program itself requires time to execute, which may be subtracted from the actual refractory time of each individual sensor. For example, an ultrasonic sensor may have a refactory period of 0.2 seconds before it can take another measurement. In certain embodiments, a new measurement from each sensor occurs every period that is the difference between the time it takes for the automated bicycle emergency braking system to execute the obstacle and emergency braking program and the particular sensor's refractory period. This arrangement may ensure that the automated bicycle emergency braking system works efficiently and has the shortest possible reaction time.

If the distance between the bicycle and the front object is less than the set threshold, then the system in step 506 may compare the determined velocity of the bicycle to a safety threshold velocity. As one example, in some implementations a safety threshold velocity of 3 km/hr may be used. If the determined velocity of the bicycle is greater than the safety threshold velocity, then the automated bicycle emergency braking system may engage the braking system of the bicycle as illustrated in step 508.

This threshold velocity may be based upon the weight of the rider and the bicycle together, according to some aspects, and in some embodiments may include other safety factors such as road surface conditions (e.g., wet versus dry, road condition, age and/or experience of the rider). Similar to the minimum allowed front distance threshold, the user in some embodiments may be able to set the safety threshold velocity.

If the determined velocity of the bicycle is not greater than the safety threshold velocity, then the system may compare a distance between an object and either side of the bicycle to a minimum allowed side distance threshold as shown in step 510 of FIG. 5. As one example, in some implementations a minimum allowed side distance threshold of 4 meters may be used. This minimum allowed side distance threshold, in some embodiments, may also be set by the user and may be set independently from the minimum allowed front distance threshold.

If this distance is less than the minimum allowed side distance threshold, then the system may compare the bank angle of the bicycle as determined from the gyroscope, as shown in step 524. If the bank angle has a magnitude greater than a minimum allowable bank angle, then the system may compare the determined velocity of the bicycle to the safety threshold velocity. If the determined velocity of the bicycle is greater than the safety threshold velocity, then the automated bicycle emergency braking system may engage the braking system of the bicycle as shown in step 508. As one example, in some implementations a minimum allowable bank angle of 8 degrees may be used. This minimum allowable bank angle is also able to be set by the user in certain embodiments and may depend upon the experience level and age of the rider, style of bicycle riding (like dense urban or suburban riding), and/or other factors.

Ultrasonic sensors may consistently scan their respective fields of view to detect new distances. This may present challenges with respect to distance data from the lateral (side) sensors. For example, if rider on the bicycle narrowly passes a car parked on the right, the distance could meet the threshold for detecting a potential collision and trigger emergency braking. However, this is undesirable because there is no danger. For this reason, side sensors may be programmed to sense oncoming cars when the bicycle is turning, based on whether the bicycle is inclined, so that the side sensors' influence on triggering emergency braking is activated or deactivated based on the data from the gyroscope. Data from the lateral sensors may be disregarded from the emergency braking program when data from the gyroscope indicates that the bicycle is not inclined, and thereby not engaged in a turn or traveling along a curve. The sensor for the front of the bicycle, on the other hand, may run continuously because as soon as either an obstacle appears in front of a bicycle or the bicycle approaches an obstacle, it is very likely that a dangerous situation has occurred requiring emergency braking. For example, when turning left, oncoming traffic may come from the left side. However, since bicycles incline when engaged in turning, the inside lateral side ultrasonic sensors may point to the ground when cornering, thereby triggering a false emergency braking maneuver, potentially without a hazardous situation. Therefore, in certain embodiments, the sensors facing out from the left side of the automated bicycle emergency braking system may only be triggered in the event of a right-hand bend, and vice versa.

Figure 6A:
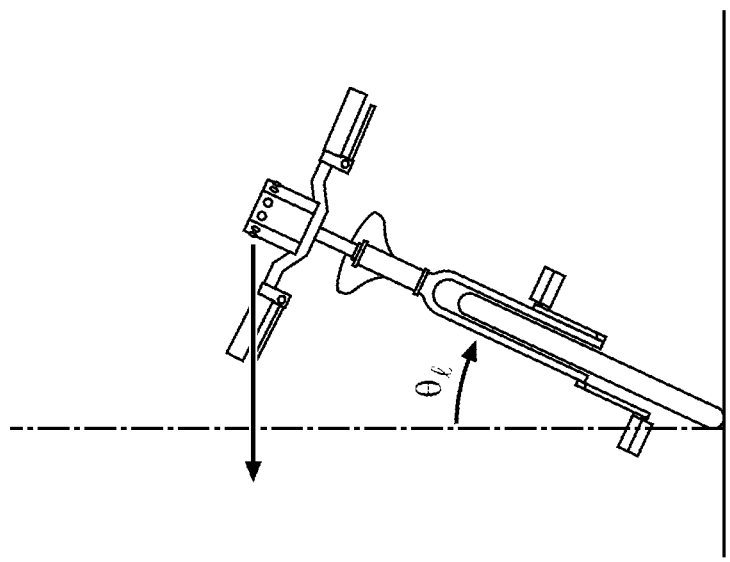
FIGS. 6A, 6B, and 6C depict an illustrative sequence of frames in a front view of the bicycle cross-road scenarios where aspects of the automated bicycle braking system may be activated to provide emergency braking.
Figure 6B:
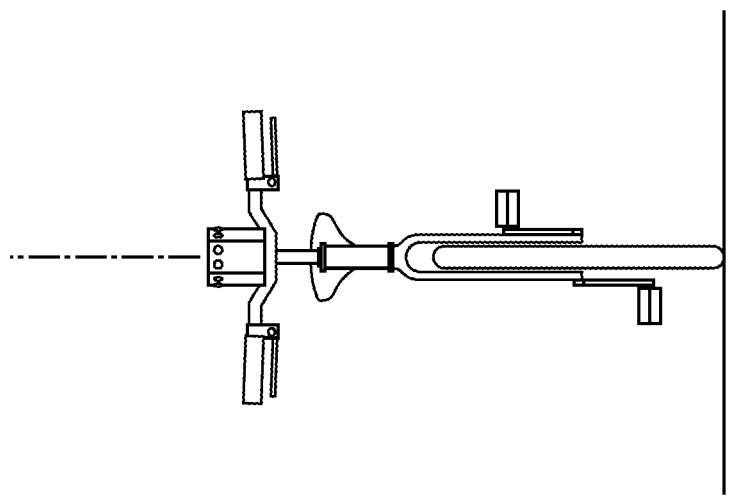

According to some aspects, the system may thus consider the direction of the bank angle of the bicycle in relation to which side sensor reports an object distanced less than the minimum allowed side distance. The side sensors may only be active when the system detects that the user appears to be turning. The system may use a bank angle of the bicycle to determine when the user is engaged in a turn. If the inclination of the bicycle is not greater than the minimum allowed side distance, then the automated bicycle emergency braking system does not engage the brakes regardless of how close an object is detected to either side of the bicycle by the side distance sensors, as illustrated in FIG. 6B and FIG. 7B. Such a configuration allows a rider to cycle close to objects (e.g., walls, hedges, parked vehicles, etc.) without the system triggering emergency braking.

Another problem is that when the bicycle and bicyclists lean sufficiently far, the side sensor on the leaned-to side may be pointed at the ground. This may generate false positives of a nearby object on that side. As exemplified in FIG. 6A, when the bicycle inclines or banks to the right, as occurs when a bicyclist turns right as shown in FIG. 7A, only the left side sensors will be considered for distance measurements to potentially hazardous objects. Distance measurements originating from the right side sensors when the bicyclist is turning right at a bank angle greater than the minimum bank angle threshold are disregarded. The system disregards these distance measurements to prevent false positives and engagement of the braking system caused by distance measurements to the ground.

Figure 6C:
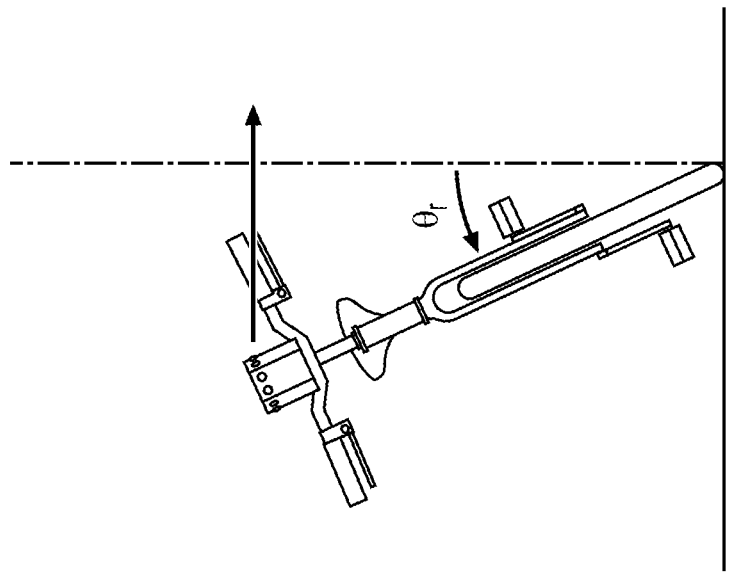

Similarly, as exemplified in FIG. 6C, when the bicycle inclines or banks to the left, as occurs when a bicyclist turns left as shown in FIG. 7C, only the right side sensors will be considered for distance measurements to potentially hazardous objects. Distance measurements originating from the left side sensors when the bicyclist is turning left at a bank angle greater than the minimum bank angle threshold are disregarded to prevent false positives and engagement of the braking system cause by distance measurements to the ground.

When any of the conditions for engaging braking as discussed above are present, the system may engage the braking system as described at step 508. In certain embodiments, the process for engaging the physical brakes of the bicycle may be programmed in such a way that the electric motor applies and releases the brake in short sections. This method of applying the brakes guarantees a gentle use of the electric motor and creates a kind of stuttering brake, which helps ensure that the rear wheel is not slipping whereby safe, rollover-free braking is possible. Additionally, as soon as the braking process is initiated by the automated bicycle emergency braking system, an audible signal may also be played via a loudspeaker to warn the driver. In other embodiments, where hydraulic braking is used, the automated braking system may begin applying an increasing pressure to the hydraulic braking line to effect increasing braking pressure.

The system after a period of time may then measure the distance to the detected hazardous object as shown in step 512. This period of time for repeated measurement may also be set by the user in certain embodiments, which allows tailoring the feel of the system to a rider's preference. The system then in step 514 may compare the previous distance measurement that was the initial basis for the system to engage braking (from step 504 and/or 510) with the second distance measurement from step 512. At step 516, the system may check the distance difference from step 514 against a threshold braking distance. As one example, in some implementations a threshold braking distance may be 5 cm. The threshold braking distance may also in certain embodiments be set by the user.

If the distance difference from step 514 is less than the threshold braking distance, then at step 518 the system may disengage the braking system of the bicycle as the system has braked effectively. However, if the distance difference from step 514 is greater than the threshold braking distance, the system in step 520 may continue engaging the braking system. In some embodiments, the system will also increase the pressure exerted on the bicycle's braking system to increase deceleration of the bicycle in emergency situations. After another set period of time, the system may disengage the braking system in step 522 and then perform a new set of measurements and calculations to determine the bicycle's state and surroundings. The set period of time for the additional braking period can be set by the user or may be determined based on the rider's weight. Additionally, the set period of time for additional braking period can be varied in scope to the bicycle's initial velocity measuring at the start of emergency braking.

Aspects described herein have detailed how a control device may cause the automated braking system to apply emergency braking when a potential collision is detected. Example pseudocode for the control logic used by the control device, according to some aspects, is presented below.

| | |
|---|---|
| Exemplary Routine A: | |
| Emergency braking triggered | |
| by front sensor | |
| Measure_3 returns the distance measured by the ultrasonic sensor at the front | distance_3 = measure_3( ) |
| (If a distance of less than 400 cm and a speed higher than 3 km/h is detected) | if (distance_3 < 400 and speedkph > 3): # prebraking initiated |
| On( ) starts the buildup of hydraulic pressure; warning signal is played | On( ) alert.play( ) |
| Measured distance is stored as previous distance | previous_distance_3 = distance_3 |
| Ultrasound sensor refractory period | time.sleep(0.2) # Meanwhile, braking pressure continues to build |
| New measurement, calculation of the difference | distance_3 = measure_3( ) |
| If the threshold is exceeded, pressure builds up for a maximum of 0.4 seconds. | dif_3 = previous_distance_3 - distance_3 if dif_3 > 5: # Continue emergency braking time.sleep(0.4*percentage) Off( ) # After around .5 seconds pressure is lowered |
| If not exceeded, pressure will be lowered. Off( ) ends the pressure buildup. | else: Off( ) # Braking canceled, pressure is lowered to normal. |

Routine A in this exemplary pseudocode may provide control logic for the control device to detect a potential front collision and apply controlled emergency braking. For example, the system may measure a distance sensed in the front direction. If the distance is less than a threshold front distance, such as 400 cm, and if the speed of the bicycle is greater than a threshold speed, such a 3 kph, the system may determine to engage the brakes of the bicycle. A first, pre-braking period may be applied where the system begins to apply braking pressure, for example via a hydraulic brake line controlling a rear brake of the bicycle. The system may provide the user with an alert, such as by playing an alert sound through a loudspeaker. The system may save the current distance as a previous distance for use in later calculations. The system may wait a period of time to allow for the pre-braking maneuver to take effect, such as 0.2 seconds. During this time, the braking pressure may continue to build. At the end of the pre-braking period, the system may again measure a distance sensed by the front sensor. If a difference between the current front distance and the prior front distance is greater than a threshold amount, such as more than 5 cm, the system may determine that additional emergency braking is needed. The system may wait to continue to allow the braking pressure to increase for an additional braking period, such as 0.4 seconds. At the end of the additional braking period, the system may turn off the braking pressure application such as by releasing the hydraulic pressure. If the difference between the current front distance and the prior front distance is instead less that the threshold amount, then the system may release the braking pressure without an additional braking period as the emergency braking has succeeded.

The maximum braking time and pressure, as illustrated in Exemplary Routine A, may be adjusted based on an estimate of the kinetic energy of the bicycle and user, as represented by a percentage value described further below with respect to Exemplary Routine B.

```
Routine B:
Determination of the percentage        kin_energy = 0.5 * mass *
reduction of the braking force         (speedkph/3.6)*(speedkph/3.6)
(speedkph is constantly being          percentage = (kin_energy/691)
redefined in the background)           if percentage > 1:
                                          percentage = 1
```

Exemplary Routine B illustrates how the control logic may determine a kinematic scaling value for use in adjusting the maximum braking time and pressure. An estimate of the kinematic energy (KE) of the bicycle and rider may be determined. In the example illustrated in Exemplary Routine B, the KE of the rider/bicycle combination may be determined based on a mass of the rider/bicycle and the speed of the bicycle. The mass of the rider/bicycle combination may be set by the user, or may be pre-defined and/or dynamically determined. The speed may be determined during operation as described above. Based on the current kinetic energy of the bicycle, the control logic may determine a percentage of maximum braking force to apply based on a constant value pre-defined based on a maximum safe controlled braking pressure. This percentage may then be used to scale the maximum braking pressure and duration of additional braking period (and/or pre-braking period), As described above, the system may operate to detect potential side collisions during turns. Example control logic for this feature may be seen below in Exemplary Routine C:

```
Exemplary Routine C:
Emergency braking triggered
by side sensor
Gyroscope measures bank angle           bank_angle = get_x_rotation( )
The same procedure as for front         distance_1 = measure_1( )
sensors, where in addition the          if (distance_1 < 400 and speedkph > 3
bank angle must have a certain              and bank_angle > 8):
value.                                  # prebraking initiated
In this example, a sensor on the
right is used. Since the right-hand        On( )
sensors are only activated for             alert.play( )
left-hand curves, the braking
process can only be started if the      previous_distance_1 = distance_1
bank angle is greater than 8deg.        time.sleep(0.2)
                                        distance_1 = measure_1( )
                                        dif_1 = previous_distance_1 -
                                            distance_1
                                        if dif_1 > 5:
                                            # Continue emergency braking
                                            time.sleep(0.4*percentage)
                                            Off( )
                                            # After around .5 seconds pressure
                                            is lowered
                                        else:
                                            Off( )
                                            # Braking canceled, pressure is
                                            lowered to normal.
```

Exemplary Routine C proceed similarly to Routine A, but further takes into account a bank angle measured by the gyroscope to determine whether to disregard distance data from the side sensor. When the bicycle is leaned more than a threshold amount away from the normal, such as 8 degrees, the bicycle may activate the distance sensor on the opposite side of the lean. Like the front collision scenario, if an object is detected within a threshold distance and the bicycle speed meets a threshold speed, the control system may detect a potential side collision. But a side collision may only be detected if the bank angle measured by the gyroscope indicates the user is in a turn. Otherwise, the emergency braking process proceeds the same. Different thresholds may be used for the side collision scenario as compared to the front collision scenario.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An automated braking system configured to attach to a bicycle and engage a braking system of the bicycle, comprising:
    an accelerometer or a speedometer for use in determining a velocity of the bicycle;
    a gyroscope for use in determining a bank angle of the bicycle;
    a front distance sensor, mounted to a front of the bicycle;
    at least one right side distance sensor, oriented to measure a distance to objects on a right side of the bicycle relative to the front distance sensor;
    at least one left side distance sensor, oriented to measure a distance to objects on a left side of the bicycle relative to the front distance sensor;

a braking interface device configured to engage the braking system of the bicycle to apply braking pressure to a wheel of the bicycle;
a control device configured to:
control the braking interface device to apply braking pressure to the wheel of the bicycle, based on the front distance sensor, based on a determination that:
the front distance sensor senses a first front distance measurement that is below a first threshold distance; and
the velocity of the bicycle as determined from the accelerometer or the speedometer is greater than a first threshold velocity;
control the braking interface device to apply braking pressure to the wheel of the bicycle, based on the at least one left side distance sensor, based on a determination that:
the gyroscope senses a bank angle greater than a threshold bank angle with an inclination to the right;
the at least one left side sensor senses a left distance measurement less than a second threshold distance; and
the velocity of the bicycle as determined from the accelerometer or the speedometer is greater than a second threshold velocity; and
control the braking interface device to apply braking pressure to the wheel of the bicycle, based on the at least one right side distance sensor, based on a determination that:
the gyroscope senses a bank angle greater than a threshold bank angle with an inclination to the left;
the at least one right side sensor sense a right distance measurement less than the second threshold distance; and
the velocity of the bicycle as determined from the accelerometer or the speedometer is greater than the second threshold velocity.

2. The automated braking system of claim 1, wherein the first threshold distance and the second threshold distance are the same.

3. The automated braking system of claim 1, wherein the first threshold velocity and the second threshold velocity are the same.

4. The automated braking system of claim 1, wherein the braking interface device engages the braking system of the bicycle by asserting a force to a handlebar brake lever to apply braking pressure to the wheel of the bicycle.

5. The automated braking system of claim 1, wherein the braking interface device engages the braking system of the bicycle by applying pressure in a hydraulic line of the braking system of the bicycle.

6. The automated braking system of claim 5, wherein applying pressure in a hydraulic line of the braking system of the bicycle comprises increasing pressure over a period of time.

7. The automated braking system of claim 1, wherein the control device is further configured to:
control the braking interface device to apply braking pressure to the wheel of the bicycle, based on the front distance sensor, for a first front distance braking period; and
control the braking interface device to apply braking pressure to the wheel of the bicycle, based on the left side sensor, for a first side distance braking period; and
control the braking interface device to apply braking pressure to the wheel of the bicycle, based on the right side sensor, for the first side distance braking period.

8. The automated braking system of claim 7, wherein the braking interface device applies increasing braking pressure over the first front distance braking period and the first side distance braking period.

9. The automated braking system of claim 7, wherein the first front distance braking period and the first side distance braking period are the same.

10. The automated braking system of claim 7, wherein the control device is further configured to:
control the braking interface device to apply braking pressure to the wheel of the bicycle for an additional braking period when:
the front sensor senses a second front distance measurement after the first front distance braking period and when a difference between the first front distance measurement and the second front distance measurement is greater than a threshold front distance difference; and
the left side sensor senses a second left side distance measurement after the first side distance braking period and when a difference between the first side distance measurement and the second side distance measurement is greater than a threshold side distance difference; and
the right side sensor senses a second right side distance measurement after the first side distance braking period and when a different between the first right side distance measurements and the second side distance measurement is greater than the threshold side distance difference.

11. The automated braking system of claim 10, wherein the additional braking period is scaled using a kinetic scaling value determined based on a kinetic energy of the bicycle.

12. The automated braking system of claim 11, wherein the kinetic scaling value is determined based on a user configurable parameter.

13. The automated braking system of claim 12, wherein the user configurable parameter corresponds to a mass of the bicycle and a mass of a rider of the bicycle.

14. The automated braking system of claim 11, wherein the kinetic scaling value corresponds to a maximum safe braking pressure or a maximum safe braking speed.

15. The automated braking system of claim 1, wherein the front distance sensor, at least one left side distance sensor, and at least one right side distance sensor are ultrasonic sensors.

16. An automated braking system configured to attach to a bicycle and engage a braking system of the bicycle, comprising:
an accelerometer or a speedometer for use in determining a velocity of the bicycle;
a gyroscope for use in determining a bank angle of the bicycle;
a sensor array comprising one or more sensors and configured to measure:
a front distance to objects in front of the bicycle;
a right side distance to objects on a right side of the bicycle, relative to the front of the bicycle; and
a left side distance to objects on a left side of the bicycle, relative to the front of the bicycle;
a braking interface device configured to engage the braking system of the bicycle to apply braking pressure to a wheel of the bicycle;

a control device configured to:
- control the braking interface device to apply braking pressure to the wheel of the bicycle, based on a determination that:
  - the sensor array senses a first front distance measurement that is below a first threshold distance; and
  - the velocity of the bicycle as determined from the accelerometer or the speedometer is greater than a first threshold velocity;
- control the braking interface device to apply braking pressure to the wheel of the bicycle, based on a determination that:
  - the gyroscope senses a bank angle greater than a threshold bank angle with an inclination to the right;
  - the sensor array senses a left distance measurement less than a second threshold distance; and
  - the velocity of the bicycle as determined from the accelerometer or the speedometer is greater than a second threshold velocity; and
- control the braking interface device to apply braking pressure to the wheel of the bicycle, based on a determination that:
  - the gyroscope senses a bank angle greater than a threshold bank angle with an inclination to the left;
  - the sensor array senses a right distance measurement less than the second threshold distance; and
  - the velocity of the bicycle as determined from the accelerometer or the speedometer is greater than a second threshold velocity.

17. The automated braking system of claim 16, wherein the sensor array comprises a LIDAR sensor.

18. The automated braking system of claim 16, wherein the control device is further configured to:
- bicycle, based on the front distance sensed by the sensor array, for a first front distance braking period; and
- control the braking interface device to apply braking pressure to the wheel of the bicycle, based on the left distance sensed by the sensor array, for a first side distance braking period; and
- control the braking interface device to apply braking pressure to the wheel of the bicycle, based on the right distance sensed by the sensor array, for the first side distance braking period.

19. The automated braking system of claim 18, wherein the control device is further configured to:
- control the braking interface device to apply braking pressure to the wheel of the bicycle for an additional braking period when:
  - the sensor array senses a second front distance measurement after the first front distance braking period and when a difference between the first front distance measurement and the second front distance measurement is greater than a threshold front distance difference; and
  - the sensor array senses a second left side distance measurement after the first side distance braking period and when a difference between the first side distance measurement and the second side distance measurement is greater than a threshold side distance difference; and
  - the sensor array senses a second right side distance measurement after the first side distance braking period and when a different between the first right side distance measurements and the second side distance measurement is greater than the threshold side distance difference.

20. The automated braking system of claim 19, wherein the additional braking period is scaled using a kinetic scaling value determined based on a kinetic energy of the bicycle.

* * * * *